United States Patent [19]

Hasegawa

[11] Patent Number: 5,365,390
[45] Date of Patent: Nov. 15, 1994

[54] MAGNETIC HEAD ACTUATOR WITH IMPROVED SUPPORT

[75] Inventor: Masahide Hasegawa, Kanagawa, Japan

[73] Assignee: Canon Kabushiki Kaisha, Tokyo, Japan

[21] Appl. No.: 941,983

[22] Filed: Sep. 8, 1992

[30] Foreign Application Priority Data

Sep. 10, 1991 [JP] Japan .................................. 3-230257
Jan. 28, 1992 [JP] Japan .................................. 4-013387

[51] Int. Cl.⁵ .......................................... G11B 5/588
[52] U.S. Cl. ...................................... 360/107; 360/84
[58] Field of Search ............... 360/104, 107, 108, 109, 360/84, 130.21, 130.22, 130.23, 130.24

[56] References Cited

U.S. PATENT DOCUMENTS

| | | | |
|---|---|---|---|
| 4,389,680 | 6/1983 | Gramling | 360/107 |
| 4,446,497 | 5/1984 | Hirayama | 360/109 |
| 4,476,404 | 10/1984 | Bygdnes | 360/108 |
| 4,672,489 | 6/1987 | Wada et al. | 360/107 |
| 4,930,030 | 5/1990 | Yabu et al. | 360/107 |
| 4,985,794 | 1/1991 | Kato et al. | 360/107 |
| 5,134,252 | 7/1992 | Himeno et al. | 360/107 |
| 5,223,992 | 6/1993 | Mitsuhashi | 360/109 |

*Primary Examiner*—John H. Wolff
*Assistant Examiner*—David L. Ometz
*Attorney, Agent, or Firm*—Robin, Blecker, Daley & Driscoll

[57] ABSTRACT

A magnetic head actuator for displacing magnetic heads in a VTR or the like for the purpose of a tracking action includes a magnetic member arranged to form a magnetic path having an air gap, a coil bobbin disposed within the air gap, and an elastic support member arranged to carry the coil bobbin in such a manner that the coil bobbin is displaceable within the air gap. The elastic support member has a projection formed at a part where the elastic support member is secured to the coil bobbin. At least one magnetic head is secured to a fore end of the projection. A through hole is arranged in the middle part of the projection to allow a part of a yoke constituting the magnetic member to pierce through the through hole.

16 Claims, 8 Drawing Sheets

MAGNETIC HEAD ACTUATOR WITH IMPROVED SUPPORT

BACKGROUND OF THE INVENTION

1. Field of the Invention

This invention relates to a magnetic head actuator for causing a magnetic head to perform a tracking action by displacing the magnetic head in an apparatus such as a VTR (magnetic tape recorder) or the like.

2. Description of the Related Art

The known device of this kind has heretofore been arranged to use a voice coil or a bimorph element.

FIG. 1 shows by way of example the magnetic head actuator using a voice coil. The illustration which is a sectional view taken in the direction of the axis of a cylindrical shape includes cylindrical permanent magnets 201a and 201b; an inner yoke 202; outer yokes 203a, 203b and 203c; magnetic heads 208a and 208b; gimbal springs 205 and 206; a coil bobbin 204; and the voice coil 214.

The two cylindrical permanent magnets 201a and 201b are arranged to have their same magnetic poles (N poles, in this case) opposed to each other. Therefore, magnetic fluxes emitted from these magnets 201a and 201b pass the inner yoke 202 and an air gap part 210 where the voice coil 214 is disposed and come back to the S poles of the magnets 201a and 201b through the outer yokes 203a, 203b and 203c. A radial magnetic field is thus formed within the air gap part 210 from the inner yoke 202 toward the outer yoke 203b. The voice coil 214 is mounted on the two gimbal springs 205 and 206 which are disposed outside the permanent magnets 201a and 201b. The voice coil 214 is thus supported so as to be displaceable solely in the axial direction thereof. With a current applied to the voice coil 214, therefore, an electromagnetic force is generated between the voice coil 214 and the magnetic field within the air gap part 210. The voice coil 214 thus can be axially displaced by the electromagnetic force up to a position where the voice coil 214 comes to be balanced with the reaction forces of the gimbal springs 205 and 206. Referring to FIG. 2, the magnetic heads 208a and 208b are secured to a projection formed in a part of the gimbal spring 206 which is secured to the voice coil 214. The magnetic head actuator is arranged in this manner.

According to the above-stated arrangement, however, the outside diameter of the magnetic head actuator becomes larger as the gimbal springs 205 and 206 are disposed on the outside of the diameter of the air gap part 210.

Generally, the performance of the magnetic head actuator (in terms of amplitude, response frequency, etc.) increases with the volume of the air gap part and the magnetic flux density. In other words, the performance degrades accordingly as the sectional area of the magnet decreases. According to the conventional arrangement, therefore, the diameter of the magnetic head actuator is difficult to reduce to a sufficient extent in conformity to the reduction in diameter of a rotary head drum as desired for reduction in size of a VTR.

In the case of a digital VTR or the like, the rotational frequency of the rotary head drum has been increased. Therefore, it is difficult to improve the response frequency of the magnetic head actuator.

Another problem with the conventional device lies in the adverse effect of a leakage flux resulting from having the magnetic-head mounting part disposed close to a cutout part provided in the outer yoke.

A further problem with the conventional device lies in the following point: In a case where two or more magnetic heads are to be mounted, the size of the cutout part increases to make the rigidity of the device insufficient because of the increase in number of the heads including a wiring space necessary for them.

SUMMARY OF THE INVENTION

This invention is directed to the solution of the problems of the prior art described above. It is, therefore, an object of this invention to provide a magnetic head actuator which is arranged to have the magnetic head less affected by the leakage flux.

It is another object of this invention to provide a magnetic head actuator which is arranged in a compact size to be mountable on a rotary head drum having a small diameter.

It is a further object of this invention to provide a magnetic head actuator which is arranged not only to attain the above-stated object but also to have a high performance.

To attain these objects, a magnetic head actuator which is arranged as a preferred embodiment of this invention comprises a magnetic member arranged to form a magnetic path having an air gap; a coil bobbin disposed within the air gap; and an elastic support member arranged to carry the coil bobbin in such a manner that the coil bobbin is displaceable within the air gap, the elastic support member having a projection formed at a part where the elastic support member is secured to the coil bobbin, at least one magnetic head being secured to a fore end of the projection, and the projection having a through hole formed in a middle part thereof to allow a part of a yoke constituting the magnetic member to pierce through the through hole.

In this embodiment, the through hole provided in the magnetic-head mounting projection is arranged to allow a part of an outer yoke to pierce therethrough. The arrangement mitigates the adverse effect of a leakage flux and permits a reduction in the outside diameter of the outer yoke.

The above and other objects and features of this invention will become apparent from the following detailed description of embodiments thereof taken in connection with the accompanying drawings.

DETAILED DESCRIPTION OF THE PREFERRED EMBODIMENTS

Figure 3:
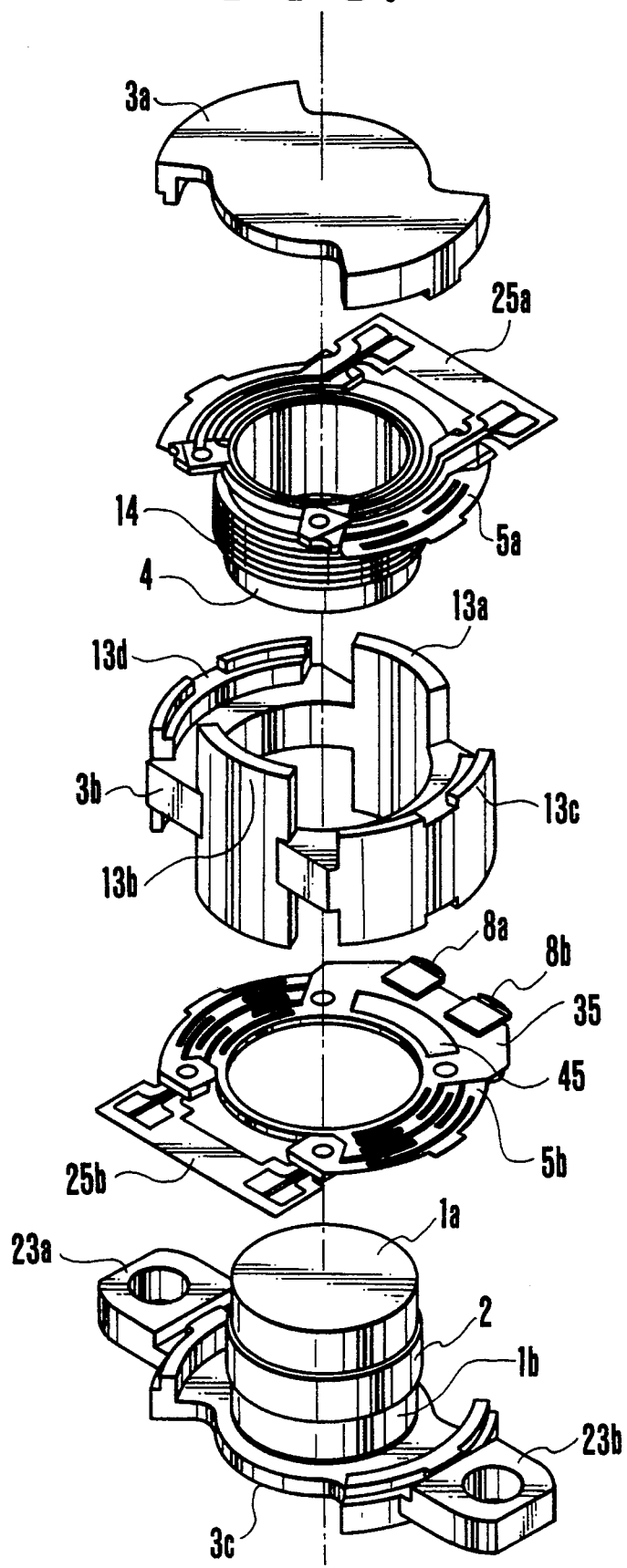
FIG. 3 is an exploded oblique view showing a magnetic head actuator which is arranged according to this invention as an embodiment thereof.
Figure 4:
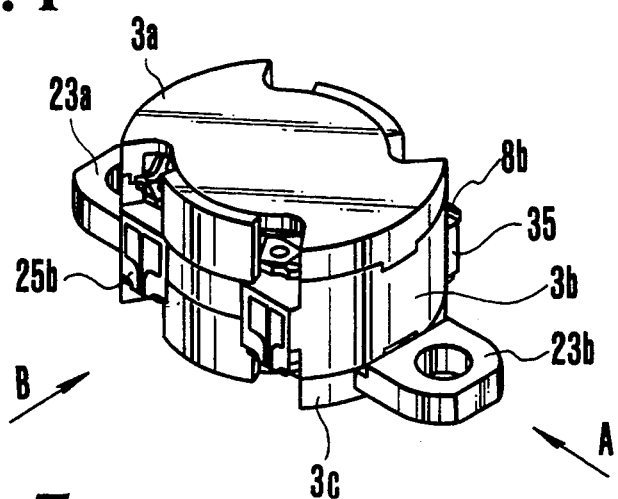
FIG. 4 is an oblique view showing the same magnetic head actuator as in an assembled state.
Figure 5:
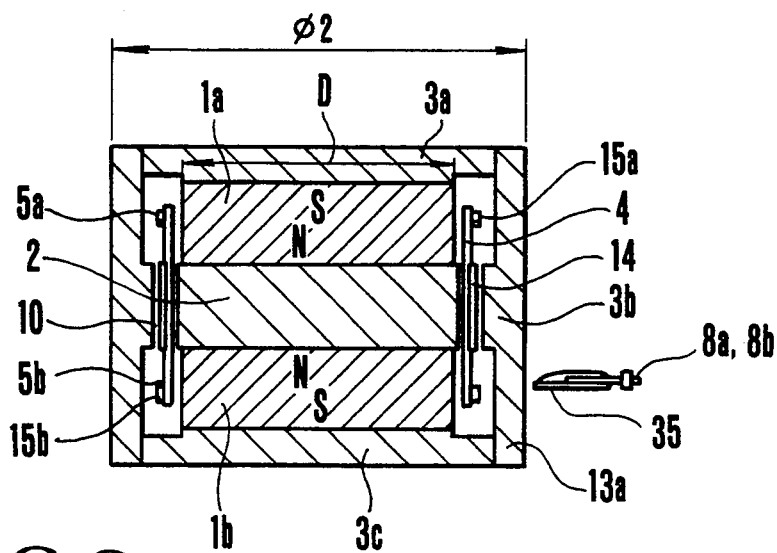
FIG. 5 is a sectional view of the same magnetic head actuator taken in the direction of arrow A of FIG. 4.
Figure 6:
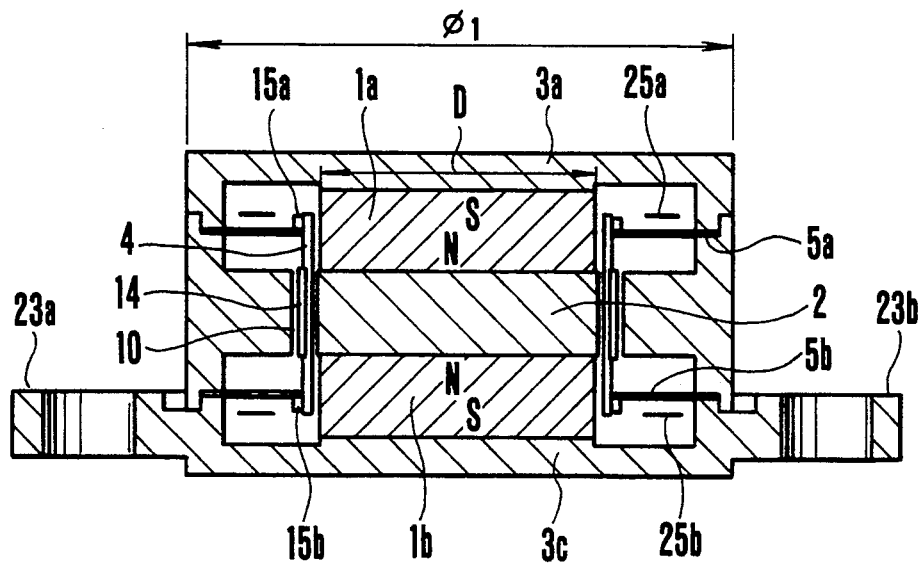
FIG. 6 is a sectional view of the same magnetic head actuator taken in the direction of arrow B of FIG. 4.

FIGS. 3 to 6 show a first embodiment of this invention. FIG. 3 is an exploded oblique view. FIG. 4 is an oblique view showing an assembled state. FIGS. 5 and 6 are sectional views showing the first embodiment as viewed in the directions of arrows A and B of FIG. 4, respectively.

These illustrations include permanent magnets $1a$ and $1b$; an inner yoke 2; outer yokes $3a$, $3b$ and $3c$; a coil bobbin 4; gimbal springs $5a$ and $5b$; magnetic heads $8a$ and $8b$; a voice coil 14; flexible printed circuit boards $25a$ and $25b$ for the wiring of the voice coil 14 and the magnetic heads $8a$ and $8b$, respectively; and datum planes $23a$ and $23b$ for mounting the magnetic head actuator on a rotary head drum.

These parts are axially combined as shown in FIG. 3 and are connected to each other in some suitable manner such as by adhesion. The outer yoke $3b$ is provided with four projections $13a$, $13b$, $13c$ and $13d$. Among these projections, the projection $13a$ is coupled to the outer yoke $3c$ by extending through a through hole 45 provided in a plate-like projection 35 of the gimbal spring $5b$ on which the magnetic heads $8a$ and $8b$ are mounted.

The land parts on the fixing side of the wiring flexible printed circuit boards $25a$ and $25b$ are bent 90 degrees and are secured to one side of the outer yoke $3b$, as shown in FIG. 4. The shape on the fixing side of the printed circuit boards $25a$ and $25b$ and the method for fixing them may be changed variously according to a manner in which they are to be connected to the outside and their locations or according to any expedient manner employed in handling the magnetic head actuator.

As a result of the arrangement described above, the sectional view of FIG. 5 taken in the direction of arrow A and the sectional view of FIG. 6 taken in the direction of arrow B greatly differ from each other. In the sectional view of FIG. 5 which is taken in the radial direction in which the magnetic head actuator is moved when being mounted on the rotary head drum, the outside diameter $\phi 2$ of the outer yoke $3b$ is only slightly larger than the diameter D of the permanent magnets $1a$ and $1b$. Even when the magnetic heads $8a$ and $8b$ are brought close to the magnets, they can be saved from being excessively affected by the leakage flux as there is only a negligible amount of the magnetic flux on account of the projection $13a$ of the outer yoke $3b$. Therefore, the magnetic head actuator can be mounted even in a case where the rotary head drum has a small diameter. Further, if the diameter of the rotary head drum is the same as the conventional one, larger permanent magnets can be used for an improved performance (maximum displacement and response frequency) of the magnetic head actuator.

Figure 7:
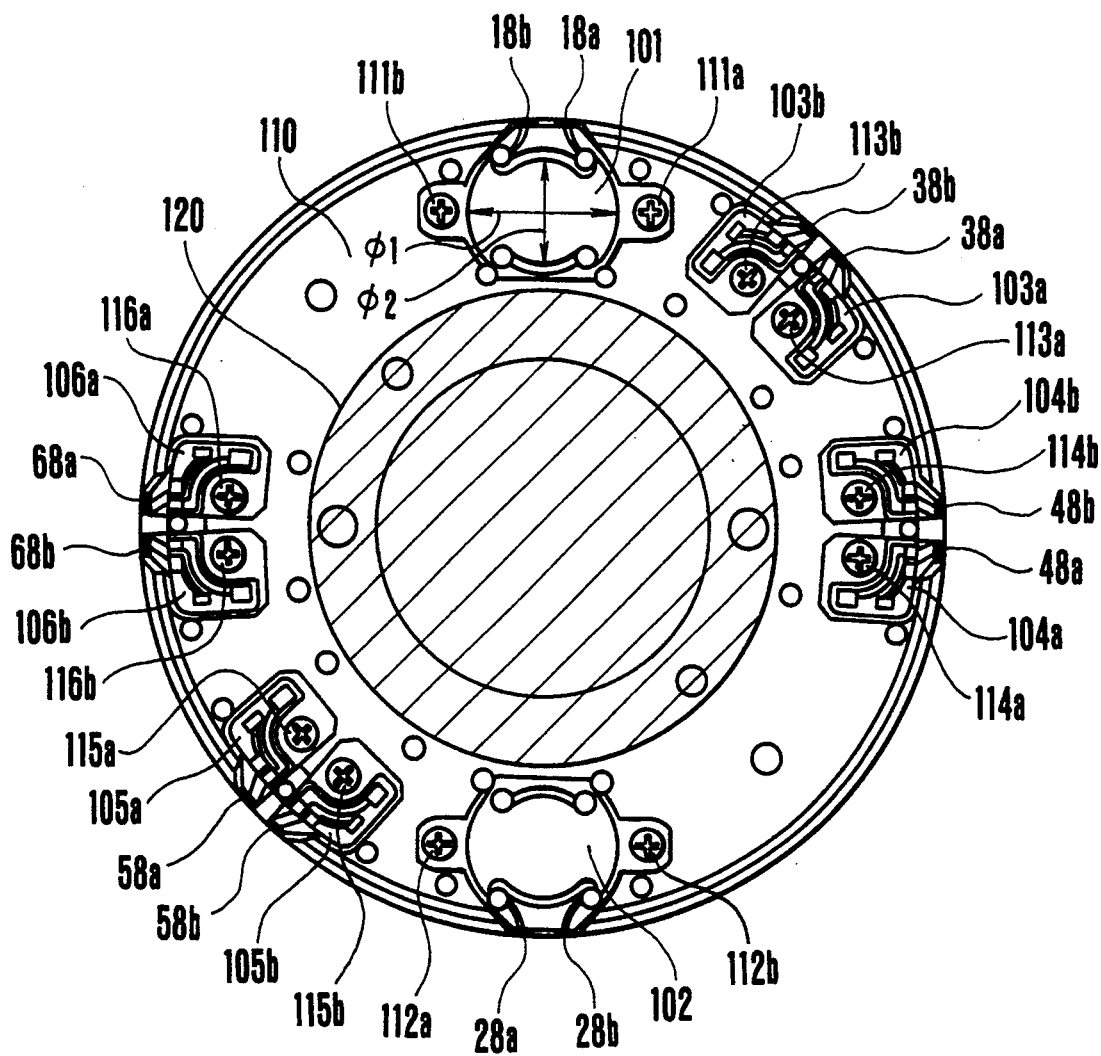
FIG. 7 is a plan view showing the same magnetic head actuator as in a mounted state on a rotary head drum.

In the case of the sectional view of FIG. 6 which is taken in the circumferential direction of the rotary head drum, the outside dimension $\phi 1$ of the outer yoke $3b$ becomes much larger than the diameter D of the permanent magnet $1a$ in the same manner as in the case the conventional device, because it is necessary to secure a space for the gimbal spring $5b$. In actually mounting the magnetic head actuator on the rotary head drum, however, the arrangement of having the diameters $\phi 1$ and $\phi 2$ in the relation of $\phi 1 > \phi 2$ presents little problem. This point is described with reference to FIG. 7 as follows: FIG. 7 shows the rotary head drum 110. The rotary head drum 110 is provided with an area 120 which is disposed near to the axis of the drum and is indicated by hatching. This area 120 is provided with a wide datum plane for centering and determining height in mounting the rotary head drum 110 on a shaft. A number of heads are arranged around this area 120. The heads thus arranged include recording heads $48a$, $48b$, $68a$ and $68b$; and erasing heads $38a$, $38b$, $58a$ and $58b$. The recording heads $48a$ and $48b$ and the recording heads $68a$ and $68b$ are respectively paired. Each pair of the heads are arranged to have azimuth angles of opposite polarities. The recording heads $68a$ and $68b$ are disposed in a position 180 degrees away from the position of the recording heads $48a$ and $48b$. The erasing heads $38a$, $38b$, $58a$ and $58b$ are arranged to be in the same relation. The recording heads are arranged 45 degrees away from the erasing heads. These heads are secured respectively to fixing members $103a$, $103b$, $104a$, $104b$, $105a$, $105b$, $106a$ and $106b$ and are secured to the rotary head drum 110 respectively by screws $113a$, $113b$, $114a$, $114b$, $115a$, $115b$, $116a$ and $116b$ in adjusted mounting positions. With these heads all set in their positions, the magnetic head actuators 101 and 102 which are arranged in accordance with this invention are disposed in spaces remaining within a doughnut-shaped area on the rotary head drum 110. The magnetic head actuators 101 and 102 are fixed in their positions by screws $111a$, $111b$, $112a$ and $112b$. The doughnut-shaped area has more space in the circumference direction than in the radial direction of the rotary head drum 110. The relation of "$\phi 1 > \phi 2$" between the outside diameters $\phi 1$ and $\phi 2$ mentioned above presents no problem. It is possible to arrange the permanent magnets of largest possible diameters rather in the more limited space available in the radial direction. Reproducing heads $18a$ and $18b$ mounted on the magnetic head actuator 101 are disposed 180 degrees away from reproducing heads $28a$ and $28b$ also mounted on the magnetic head actuator 102. These reproducing heads $18a$, $18b$, $28a$ and $28b$ are 90 degrees away from the recording heads $48a$, $48b$, $68a$ and $68b$. Each pair of heads $18a$ and $18b$ or heads $28a$ and $28b$ also have azimuth angles of opposite polarities.

Therefore, the arrangement described above enables the embodiment not only to accomplish a tracking action with a high performance but also to permit a reproducing action immediately after a recording action.

Figure 8:
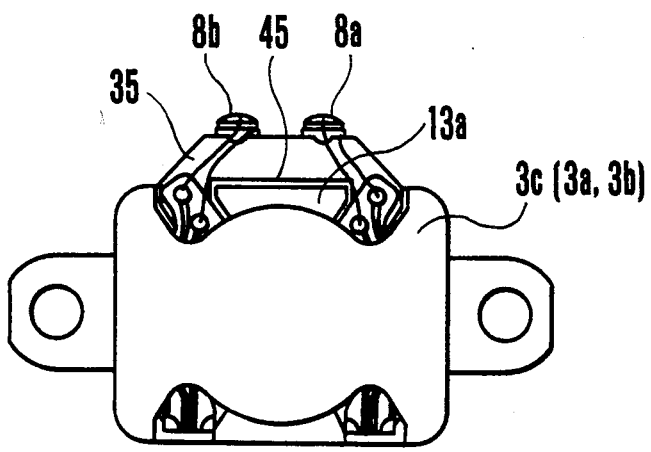
FIG. 8 is a plan view of a second embodiment of this invention.

FIG. 8 shows a second embodiment of this invention. In FIG. 8, the members having the same functions as those of the first embodiment are indicated by the same reference numerals. The internal arrangement of the second embodiment is identical with that of the first embodiment. In the case of the second embodiment, however, the outer yokes 3a, 3b and 3c are arranged in a rectangular external shape. Accordingly, the through hole 45 provided in the projection 35 of the gimbal spring 5b and the projection 13a of the outer yoke 3b differ in shape from those of the first embodiment, although they are arranged to perform the same functions.

The permanent magnet is in a cylindrical shape in both the two embodiments described. The invention is, however, of course applicable to other cases where the permanent magnets are arranged in a rectangular or a long cylindrical shape. In other words, a main feature of this invention lies in that an incontinuous part of the magnetic path is arranged to be away from the magnetic head by providing a through hole in a movable member on which the head is mounted in such a way as to allow a part of the outer yoke to pierce through the through hole.

As described above, in accordance with the arrangement of the second embodiment, the adverse effect of the leakage flux on the magnetic head is lessened by providing a through hole in the projection on which the magnetic head is mounted and by making a part of the outer yoke pierce through the through hole. In mounting the magnetic head actuator on the rotary head drum, the arrangement permits a reduction in size in the diametral direction. A magnetic head actuator of a high performance thus can be mounted on a rotary head drum even in a case where the rotary head drum has a small diameter.

The following describes a third embodiment which is a further improvement over the first and second embodiments of the invention described in the foregoing. The third embodiment is capable of solving a problem of the prior art which is as described below:

In the field of the VTR, efforts to digitize and arrange the VTR for the HDTV (high definition TV) have made progress of late. As a result, the rotational frequency of the magnetic head drum, which was 1,800 rpm in general, has come to be a triplex value, i.e., of 5,400 rpm.

A magnetic head actuator is of course necessary also for the high-speed rotary magnetic head drum. The use of the conventional magnetic head actuator as it is, however, causes various inconveniences such as a change in posture or a damage of the magnetic head due to a centrifugal force. The centrifugal acceleration can be expressed as "radius X (angular velocity)$^2$". Therefore with the radius assumed to be the same, the centrifugal force increases nine times as the rotational frequency increases three times. For example, with the radius of rotation assumed to be 30 mm and the rotational frequency to be 5,400 rpm, the centrifugal acceleration becomes 979 times as high as gravitational acceleration. Therefore, even if the mass of the voice coil, etc., are arranged to be 0.2g, a centrifugal force of about 200 gf comes to act. With the gimbal springs 205 and 206 arranged to have about uniform rigidity in the direction perpendicular to the shaft 211 as in the case of the conventional device described in the foregoing, it is hardly possible to obtain a sufficient rigidity. Therefore, it has been a problem with the conventional device that a displacement arising in the direction of the centrifugal force causes the magnetic head 208 to excessively protrude or to be permanently deformed and thus to be eventually damaged.

Figure 9:
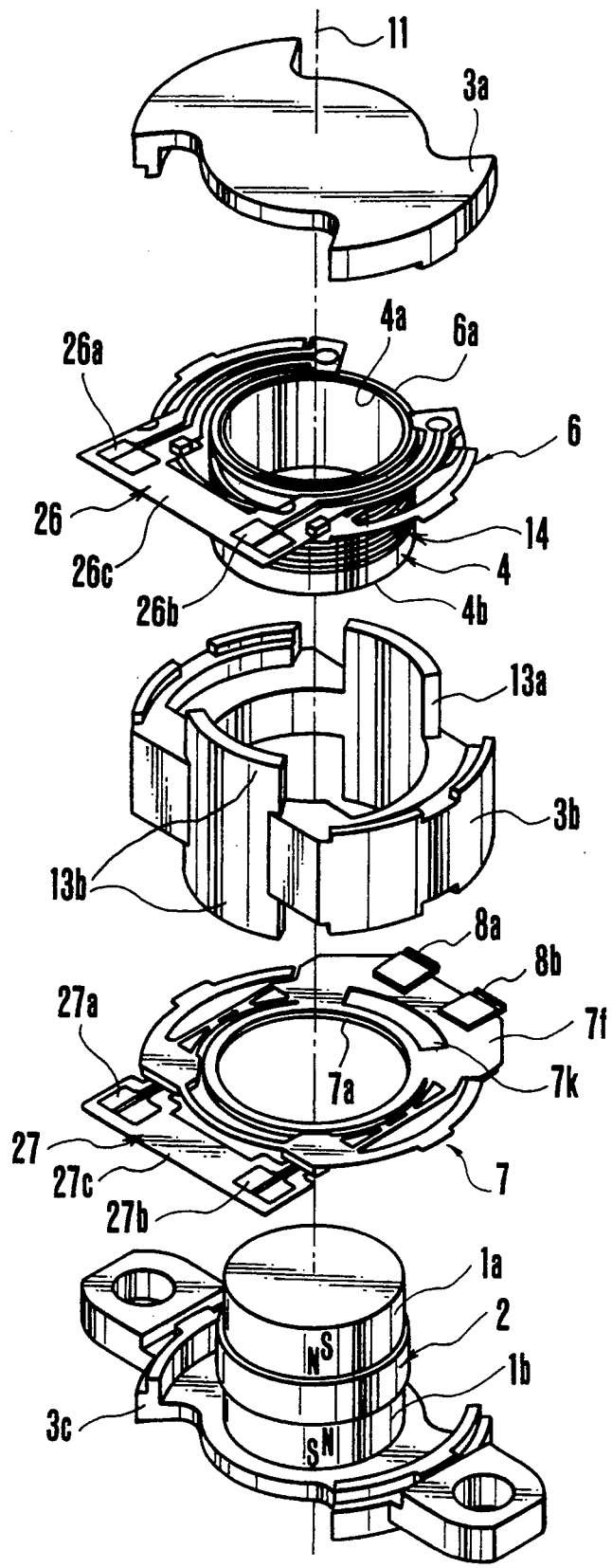
FIG. 9 is an exploded oblique view showing by way of example the arrangement of a third embodiment of this invention.
Figure 10:
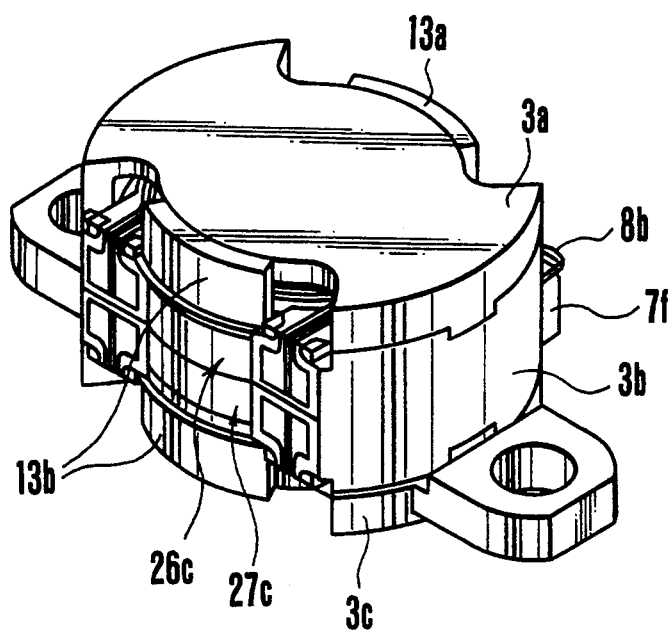
FIG. 10 is an oblique view of the third embodiment shown in FIG. 9.

The third embodiment is described with reference to FIGS. 9 and 10. FIG. 9 is an exploded oblique view and FIG. 10 is an oblique view. In these figures, all parts that are arranged in the same manner as in the case of the first or second embodiment are indicated by the same reference numerals and the details of them are omitted from the following description.

Two magnets 1a and 1b are secured to the inner yoke 2 and arranged to have their same pole sides (N pole in the case of FIG. 9) opposed to each other across the inner yoke 2. Magnetic fluxes emitted from the N poles of the two magnets 1a and 1b come from the inner yoke 2 to come back respectively to the S poles of the magnets 1a and 1b through an air gap part where the voice coil 14 is disposed and through the outer yokes 3a, 3b and 3c. A radial magnetic field is thus formed in the air gap part between the inner yoke 2 and the outer yoke 3b and extends from the inner yoke 2 toward the outer yoke 3b.

The voice coil 14 is wound around the bobbin 4. Two leaf springs 6 and 7 which are carrying the bobbin 4 are secured to the upper and lower peripheral parts 4a and 4b of the bobbin 4 together with reinforcement members 6a and 7a.

When a current is applied to the voice coil 14, therefore, an electromagnetic force is generated between the magnetic fluxes coming from the inner yoke 2 toward the outer yoke 3b. The bobbin 4 is displaced along the axis 11 until the electromagnetic force is balanced with the reaction forces of the leaf springs 6 and 7.

Figure 11:
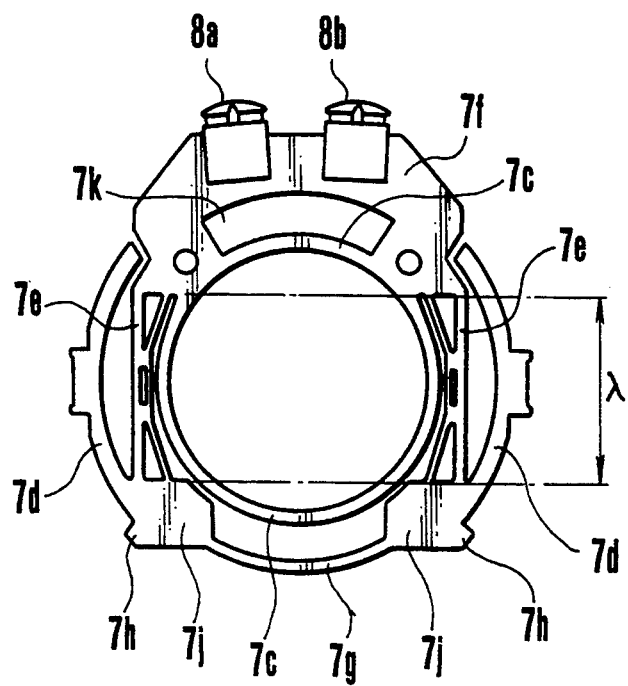
FIGS. 11 and 12 are plan views showing by way of example a leaf spring arranged in the third embodiment.
Figure 12:
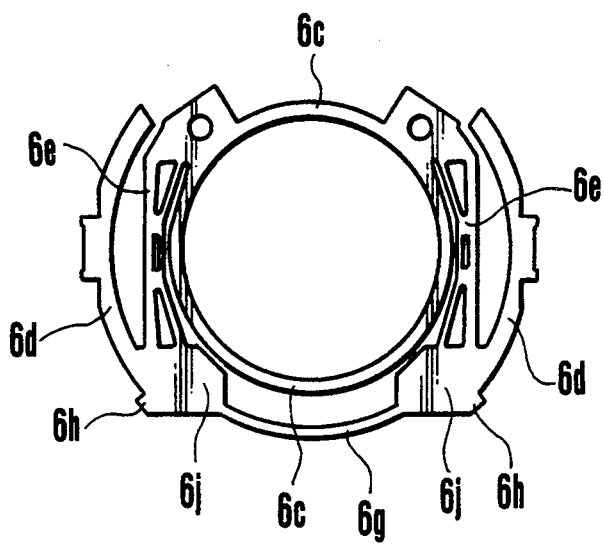

FIGS. 11 and 12 are plan views showing by way of example the arrangement of the leaf springs of the third embodiment. Referring to FIG. 11, the leaf spring 7 is composed of a movable inner circumferential part 7c which is secured to the bobbin 4; fixed outer circumferential parts 7d which are secured to the outer yokes 3b and 3c; and two cantilever-like spring parts 7e which have a smaller sectional area than other parts and interlink the inner and outer circumferential parts 7c and 7d to one another.

On one side of the inner circumferential part 7c of the leaf spring 7, there is formed a C-shaped spread part 7f. Magnetic heads 8a and 8b are secured to this spread part 7f. The windings of the magnetic heads 8a and 8b are electrically connected from the movable part to the stationary part through a flexible printed circuit board (hereinafter referred to as FPC) 27, as shown in FIG. 9. The electrodes 27a, 27b of the FPC 27 are connected to one another by a sticking part 27c. The sticking part 27c is stuck to a peripheral part of the outer yoke 3b, as shown in FIG. 10.

The use of the sticking part 27c for connecting the two electrodes 27a and 27b not only serves to permit a reduction in number of parts and facilitates positioning but also prevents the FPC 27 from peeling off with the area of the sticking part 27c increased. These two electrodes 27a and 27b may be separately arranged on right and left sides. However, the FPC 27 must be arranged to be as flexible as possible for preventing the characteristics of the magnetic head actuator from being affected by the FPC 27. The FPC 27 can be arranged to be sufficiently flexible by using the thinnest polyimide film available at present together with a rolled copper foil.

The other leaf spring 6 has no C-shaped spread part to which the magnetic heads are secured. With the exception of this point, the leaf spring 6 is arranged in the same manner as the leaf spring 7 and, as shown in FIG. 12, is composed of a movable inner circumferential part 6c; a stationary circumferential part 6d; and a spring part 6e which connects the part 6c to the part 6d. Further, the leaf spring 6 is arranged in combination with an FPC 26 shown in FIG. 9. The FPC 26 is provided with electrodes 26a and 26b which are connected to one another by a sticking part 26c. As shown in FIG. 10, the sticking part 26c is stuck to an outer peripheral part of the outer yoke 3b.

In the case of the third embodiment, the FPC 26 is in a shape obtained by cutting away a part of the shape of the other FPC 27, for the sake of common use of parts. However, the flexibility of the FPCs is somewhat impaired by this arrangement. In cases where more flexibility is necessary, the FPC 26 may be separately formed in a more suitable shape and in a conductor pattern as desired.

With the third embodiment arranged in this manner, the voice coil 14, the bobbin 4 and the magnetic heads 8a and 8b can be supported by two spring parts 6e and also by two spring parts 7e.

Figure 13:
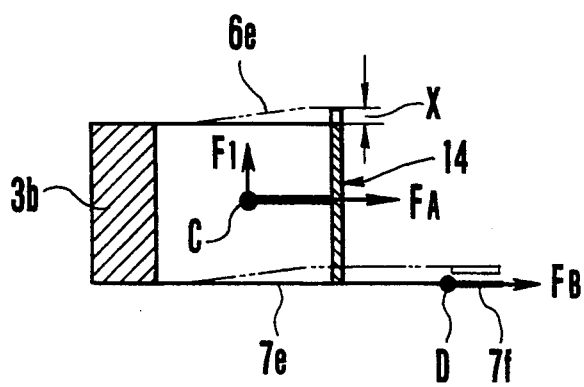
FIG. 13 shows a force acting on the movable part of the third embodiment of this invention.

FIG. 13 shows a force acting on the movable part of the third embodiment. In FIG. 13, a point D denotes the center of gravity of a part including the magnetic heads 8a and 8b and the spread part 7f. A point C denotes the center of gravity of other movable parts. The point C is at a height located about a middle point between the two leaf springs 6 and 7. The point D is at the same height as the leaf spring 7. Both the points C and D are located approximately on the center lines of the spring parts 6e and 7e as viewed on a plan view.

When a current is applied to the coil 14, an electromagnetic force F1 is generated in the direction of axis. The action point of the force F1 approximately coincides with the point C. The spring parts 6e and 7e are axially deformed by this force F1, as shown in FIG. 13, so that the magnetic heads 8a and 8b are displaced in the direction of axis. Since the angular displacement of each of the spring parts 6e and 7e is limited on both the fixed and movable sides, the postures of the magnetic heads 8a and 8b remain unchanged and the heads 8a and 8b are displaced only in the direction of axis. If the extent of displacement X is less than several % of the length $\lambda$ of the spring parts 6e and 7e shown in FIG. 11, the displacement of the magnetic heads 8a and 8b in the protruding direction is negligibly small. For example, with the length $\lambda$ assumed to be 6 mm, if the axial displacement X is 5% (0.3 mm) of the length $\lambda$, the displacement in the protruding direction is about 7 $\mu$m.

If the rotary magnetic head drum is caused to rotate at a high speed, centrifugal forces FA and FB are exerted respectively on the two centers of gravity C and D. The centrifugal forces FA and FB not only act in the direction of pulling the spring parts 6e and 7e but also as a moment of force in proportion to the axial displacement X.

Therefore, if the spring parts are in an arcuate shape like the conventional device, a great deformation is brought about by an in-plane bending force. Whereas, in the case of this embodiment, the spring parts 6e and 7e are shaped in such a way as to have straight parts arranged to be symmetric relative to the action line of the force. Therefore, it is only a tensile force that acts within the plane on the spring parts 6e and 7e. The large centrifugal forces FA and FB thus bring about only a slight amount of elongation. For example, with the total of the centrifugal forces FA and FB assumed to be 400 gf and a tensile force of 100 gf assumed to be acting on one of these spring parts, the stress of the spring part is 3.3 kgf/mm$^2$ if the straight part has a section of 0.3 mm X 0.1 mm. Further, if the leaf springs 6 and 7 are made of a bronze phosphide material (having an elastic limit of about 10,000 kgf/mm$^2$) and if the length of the spring parts 6e and 7e is 6 mm, the above-stated elongation is nothing more than 2 $\mu$m or thereabout.

Meanwhile, the moment of force acting against the axial displacement X is acting in the direction of lessening the axial displacement X. Therefore, the spring constant resulting from a deformation of the spring parts 6e and 7e obtained with the head drum in repose increases as much as the moment of force when the head drum is rotated. Therefore, the influence of the centrifugal force on the spring constant (hereinafter referred to as a "centrifugal spring effect") must be taken into consideration beforehand at the time of design work.

If the centrifugal spring effect is large, the spring parts 6e and 7e must be arranged to have a higher flexibility. However, this arrangement might cause the influence of gravity over the mass of the movable part to become no longer negligible. For example, with the mass of the movable part arranged to be 0.2g and the spring constant to be 0.02 kgf/mm in repose and 0.1 kgf/mm at the time of rotation, if the gravity comes to axially act, the axial action of gravity causes a displacement of 8 $\mu$m at the time of rotation from the position obtained when the rotary magnetic head drum is at rest.

Further, the spring parts 6e and 7e might be slightly slanting relative to the rotation plane of the rotary magnetic head drum. It is conceivable that, in such a case, the moment of force is generated because of the slant to bring about a displacement of several to scores of $\mu$m at the time of rotation from the position obtained when the head drum is at rest. Therefore, in order to mount the magnetic head actuator on the magnetic head drum at a high precision, the magnetic head actuator is mounted, for example, by rotating the head drum at about the actual operating rotational frequency and by measuring the height of the head with a length-measuring microscope using as a light source a flash device which emits light in synchronism with the rotation of the head drum.

The centrifugal force exerted on the upper and lower spring parts 6e and 7e is "FA/2" on the spring part 6e and "FA/2+FB" on the spring part 7e. The spring part 7e thus has a greater centrifugal force. In view of this, in the case of the third embodiment, the two spring parts 6e and 7e are arranged to have the same plane shape and the leaf spring 7 is arranged to be a little thicker than the leaf spring 6 in such a way as to equalize their stresses. This arrangement increases the rigidity of the spread part 7f to which the magnetic heads 8a and 8b are secured and makes the assembly precision more easily attainable. The stress equalization is of course not absolutely necessary. The maximum stress can be reduced to a sufficiently low value.

Various forces act on the magnetic heads 8a and 8b. The centrifugal force and the electromagnetic force are dominant among the various forces, including a reaction force which is exerted in the direction of pushing the heads 8a and 8b and is caused by the tension of the magnetic tape; and magnetic tape contacting and friction forces and an air flow force which are exerted in the traveling direction of the magnetic tape. The forces other than the centrifugal and electromagnetic forces are not exceeding several gf. However, the forces in the traveling direction of the magnetic tape act on the spring parts 6e and 7e as an in-plane bending force. Each of the spring parts 6e and 7e is, therefore, preferably arranged to have a sufficient in-plane rigidity.

Figure 14:
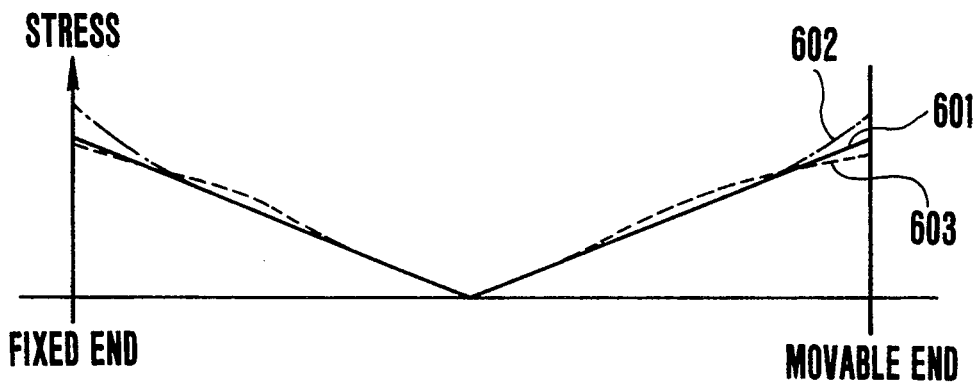
FIG. 14 shows a maximum stress developed in the spring part of the leaf spring of the third embodiment.

The stress brought about at the spring parts 6e and 7e by the axial displacement has maximum values at the two ends of each of the spring parts as indicated by a reference numeral 601 in FIG. 14, because each of the spring parts 6e and 7e has a uniform section and the angular displacement at the two ends is restricted. In addition to this, the centrifugal force acts to further increase the stresses of the two ends of the spring part as shown by a numeral 602 in FIG. 14. The maximum stress is, therefore, mitigated by arranging each spring parus to have a wider width at the two ends than in the middle part thereof as indicated by a numeral 603 in FIG. 14. In addition to this, the in-plane rigidity of the spring parts 6e and 7e is increased with holes formed to leave straight parts for receiving the centrifugal force.

Further, an arcuate connection part 7g which is arranged to connect the right and left circumferential parts 7d of the leaf spring 7 shown in FIG. 11 is secured to the outer yoke 3b. This part 7g is thus arranged to more reliably prevent the leaf spring 7 from being deformed by the centrifugal force. Further, in the case of this embodiment, projections 7h are formed in the neighborhood of the connection part 7g for the purpose of preventing the leaf spring 7 from being deformed and displaced relative to the outer yoke 3b shown in FIG. 9.

The arrangement of making the projection 13a of the outer yoke 3b pierce through a through hole part 7k provided in the leaf spring 7 not only mitigates the adverse effect of a leakage flux on the magnetic heads 8a and 8b as mentioned in the foregoing description of the first embodiment but also permits shortening the dimension of the device in the protruding direction of the magnetic head for reduction in size of the device.

The length λ of the spring part 7e is preferably arranged to be as long as possible for the purpose of minimizing the fluctuations in posture of the magnetic heads 8a and 8b as mentioned in the foregoing. However, the length λ of the spring part 7e is determined by the length and width of the straight spring part that can be disposed between the outer yoke 3b and the bobbin 4. The above-stated arrangement of the embodiment thus permits a reduction in size of the device without shortening the length λ of the spring part 7e. With the size of the embodiment assumed to be the same as the conventional device, the length of the spring part can be increased for minimization of the fluctuations in posture of the head. Further, with the embodiment arranged in the above-stated manner, if it is desired to increase the in-plane rigidity, the spring part 7e can be widened without changing the dimension of the magnetic heads 8a and 8b in the protruding direction thereof. Therefore, the in-plane rigidity can be increased without impairing the easiness of mounting the magnetic head actuator on the rotary magnetic head drum.

In accordance with the arrangement of the embodiment described, the movable part of the magnetic head actuator is supported by four leaf springs which are approximately symmetrically arranged around the center of gravity of the magnetic head actuator. The centrifugal force is arranged to act only in the direction of pulling the four leaf springs and as a returning force against the axial displacement. The influence of the centrifugal force is thus arranged to be only a centrifugal spring effect on the axial displacement, so that the magnetic head actuator can be arranged to stably operate.

The following describes a fourth embodiment of this invention. In the description of the fourth embodiment, all the parts arranged in the same manner as in the third embodiment are indicated with the same reference numerals attached to them and the details of them are omitted from the description. The fourth embodiment is arranged almost in the same manner as the third embodiment except that the shape of the leaf spring 7 is changed from the shape of the third embodiment.

Figure 15:
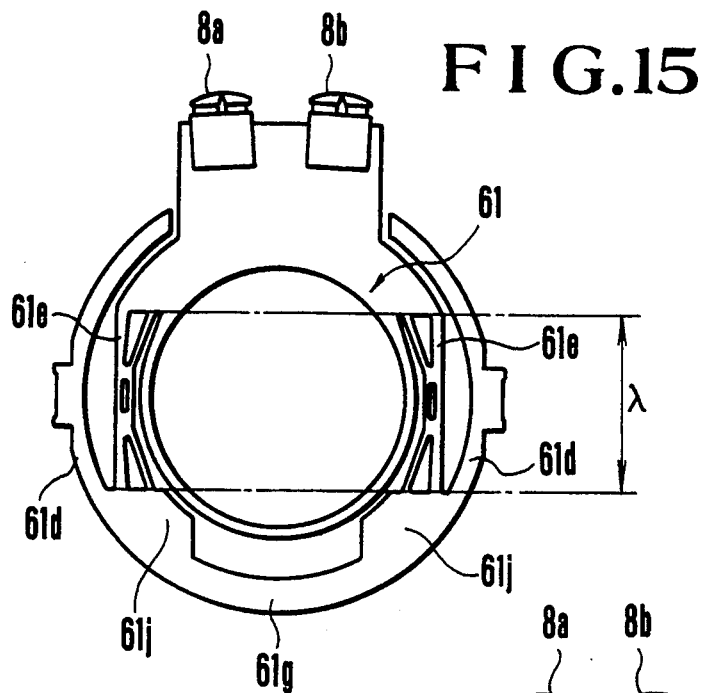
FIG. 15 is a plan view showing by way of example the leaf spring of a fourth embodiment of this invention.

FIG. 15 is a plan view showing one example of a leaf spring 61 employed in the fourth embodiment.

Figure 1:
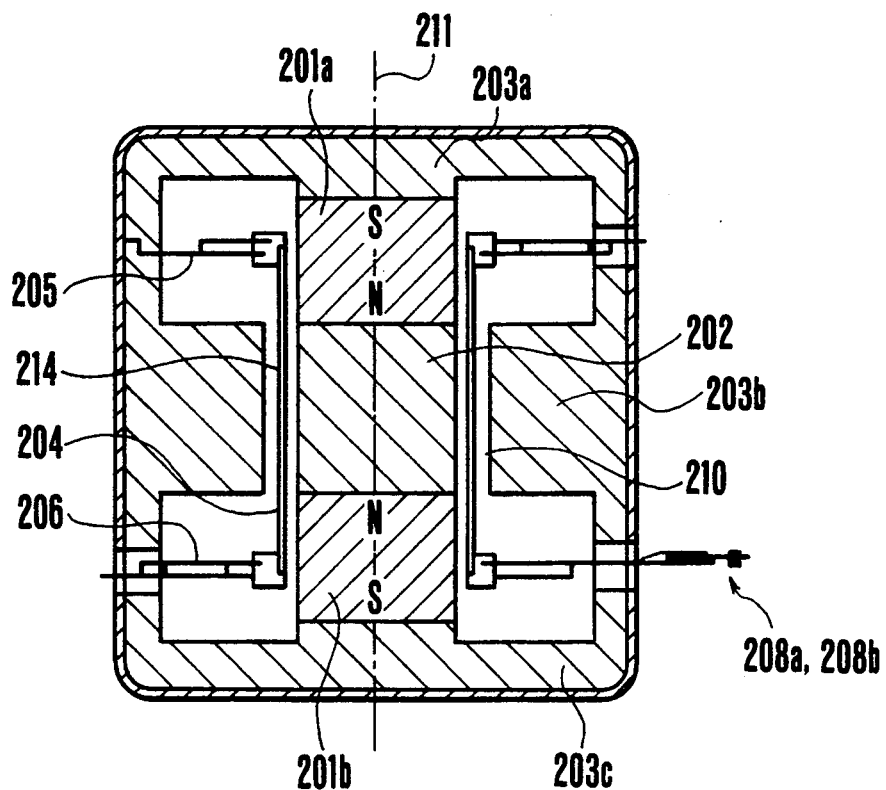
FIG. 1 is a sectional view showing one example of the conventional magnetic head actuator.
Figure 2:
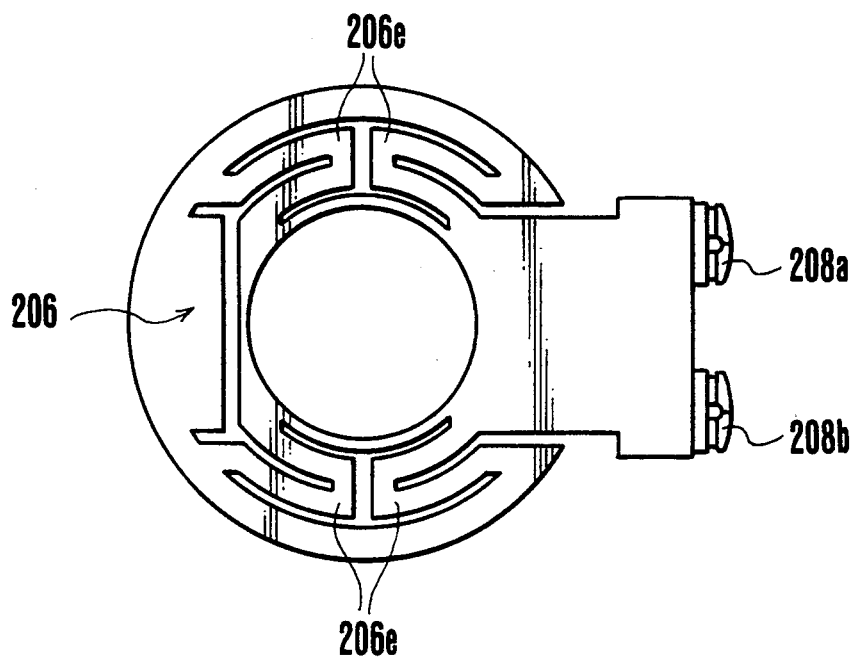
FIG. 2 is a plan view showing the gimbal spring of the conventional head actuator shown in FIG. 1.

The leaf spring 61 is formed by changing the arcuate spring part 206e of the leaf spring 206 shown in FIG. 2 to cantilever-like spring parts 61e. The action and the advantages of the fourth embodiment are about the same as the third embodiment. The projection of the outer yoke 3b abuts on the inner side of a connection part 61g which connect right and left circumferential parts 61d, so that the adverse effect of the centrifugal force can be mitigated in the same manner as in the third embodiment.

Further, the outer circumferential parts 61d may be arranged to be supported by boring holes in parts 61j near the fixed ends of the spring parts 61e and by allowing pins erected on the outer yoke 3b to pierce through these holes or by some other suitable method.

Figure 16:
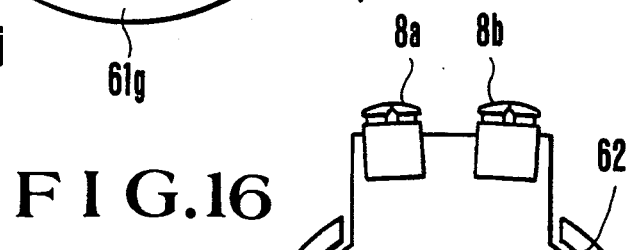
FIG. 16 is a plan view showing a second example of the leaf spring of the fourth embodiment.

FIG. 16 is a plan view showing a second example of the leaf spring of the fourth embodiment as a leaf spring 62. The leaf spring 62 is formed by changing the spring parts 61e of the above-stated leaf spring 61 of the first example into spring parts 62e which are in a simpler shape. In a case where a smaller in-plane rigidity is acceptable, this simpler shape enables the fourth embodiment to act and give advantageous effects in about the same manner as the third embodiment.

Figure 17:
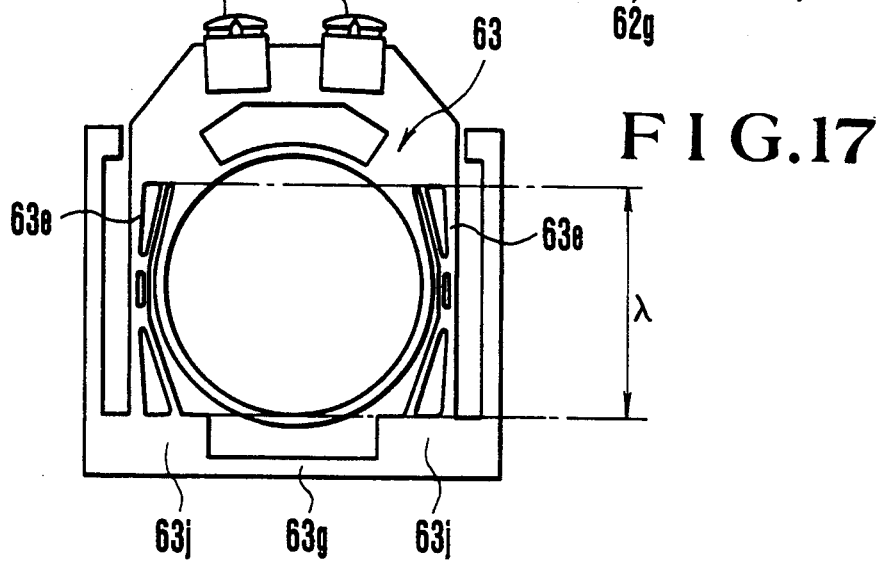
FIG. 17 is a plan view showing a third example of the leaf spring of the fourth embodiment.

FIG. 17 is a plan view showing a third example of the leaf spring of the fourth embodiment as a leaf spring 63. The leaf spring 63 is applicable to a rectangular magnetic head actuator and enables the fourth embodiment to act and give advantageous effect in about the same manner as the third embodiment. An additional advantage of the third example lies in that the length of spring parts 63e can be further increased without increasing the dimension of the rotary magnetic head drum in the radial direction thereof.

In the case of each of the third and fourth embodiments, the straight parts of the spring parts have been described as arranged to be in parallel to the radial direction of the rotary magnetic head drum. In actuality, however, the straight parts may be allowed to be somewhat slanting.

However, the centrifugal force brings about a bending stress if the straight parts are arranged aslant in the same direction relative to the radial direction. Therefore, the straight parts of the spring parts may be arranged to be somewhat slanting toward each other. It must be taken into consideration that tensile forces on these straight parts of the spring parts increase, under the same centrifugal force, accordingly as the slanting angle of the straight parts is increased.

Further, this invention is applicable either to a system consisting of a plurality of equipments or to an apparatus which is composed of a single equipment. It goes without saying that this invention is also applicable to a case where the objects of the invention are attained by supplying a program to a system or to an apparatus.

According to the arrangement of the third or fourth embodiment, the adverse effect of a centrifugal force due to the rotation of the magnetic head drum is mitigated to enable the magnetic head actuator to stably operate in a state of being mounted on the magnetic head drum.

What is claimed is:

1. A magnetic head actuator comprising:
   a) a magnetic member arranged to form a magnetic path having an air gap;
   b) a coil bobbin disposed within said air gap; and
   c) an elastic support member arranged to carry said coil bobbin in such a manner that said coil bobbin is displaceable within said air gap, said elastic support member having a projection formed at a first part where said elastic support member is secured to said coil bobbin, at least one magnetic head being secured to a fore end of said projection, and said projection having a through hole formed in a second part between said first part and said fore end of said projection to allow a part of a yoke constituting said magnetic member to pierce through said through hole, whereby said part of said yoke shields said magnetic head from stray magnetic flux leakage.

2. An actuator according to claim 1, wherein said magnetic member includes a permanent magnet disposed inside said coil bobbin, a first yoke on which said permanent magnet is mounted, and a second yoke disposed to surround said coil bobbin, and wherein a part of said second yoke is coupled to said first yoke by piercing through said through hole.

3. An actuator according to claim 2, further comprising a wiring part for transmitting information obtained by said magnetic head, a part of said wiring part being externally exposed and the exposed part of said wiring part being secured to said second yoke.

4. An actuator according to claim 1, wherein an elastic deformation part of said elastic support member is disposed in a position whose phase deviates about 90 degrees from that of said magnetic head.

5. An actuator according to claim 1, wherein said elastic support member is attached to each of both ends of said coil bobbin.

6. An actuator according to claim 5, wherein said magnetic head is mounted on one side of said elastic support member.

7. A magnetic head actuator comprising:
   a) a coil forming part including a hollow coil;
   b) a magnetic flux generating part loosely fitted within the coil of said coil forming part and arranged to generate a magnetic flux;
   c) a magnetic path forming part arranged to encompass said coil forming part and to induce, around said coil, the magnetic flux generated by said magnetic flux generating part;
   d) a support part fixed to said magnetic path forming part and said coil forming part, and arranged to movably support said coil forming part between said magnetic path forming part and said magnetic flux generating part; and
   e) at least one magnetic head disposed on projection part formed at a first part where said coil forming part is fixed to said support part, wherein said support part includes an elastic part which interlinks said magnetic path forming part and said coil forming part, said elastic part being composed of at least two cantilever-like members each having an approximately straight part disposed in a direction where said projection part protrudes from said first part and wherein said support part is provided with a through hole for allowing a part of said magnetic path forming part to pierce through said through hole, whereby said part of said magnetic path forming part shields said magnetic head from stray magnetic flux leakage.

8. An actuator according to claim 7, wherein each of said cantilever-like members is a leaf spring.

9. An actuator according to claim 8, wherein said leaf spring is arranged to have a wider width in the neighborhood of both ends thereof than in the middle part thereof.

10. An actuator according to claim 7, wherein said through hole is formed adjacent to a part of said support part where said magnetic head is fixed to said support part.

11. A rotary head drum comprising:
    a) a drum body; and
    b) a magnetic head actuator including:
       a magnetic member arranged to form a magnetic path having an air gap;
       a coil bobbin disposed within said air gap; and
       an elastic support member arranged to carry said coil bobbin in such a manner that said coil bobbin is displaceable within said air gap, said elastic support member having a projection formed at a first part where said elastic support member is secured to said coil bobbin, at least one magnetic head being secured to a fore end of said projection, and said projection having a through hole formed in a second part between said first part and said fore end of said projection to allow a part of a yoke constituting said magnetic member to pierce through said through hole, whereby said part of said yoke shields said magnetic head from stray magnetic flux leakage.

12. A drum according to claim 11, wherein said magnetic head includes reproducing heads for reproducing information recorded on a recording medium.

13. A drum according to claim 12, wherein said reproducing heads are disposed in different positions, the phases of which deviate 180 degrees from each other.

14. A drum according to claim 13, wherein recording heads are disposed in positions the phases of which deviate 90 degrees from those of said reproducing heads.

15. A drum according to claim 14, wherein erasing heads are disposed between said reproducing heads and said recording heads.

16. A recording or reproducing apparatus having a rotary head drum according to claim 15.

* * * * *